(12) United States Patent
George et al.

(10) Patent No.: US 6,440,266 B1
(45) Date of Patent: *Aug. 27, 2002

(54) PRODUCTION OF REACTIVE MATERIAL CONTAINING WEBS

(75) Inventors: Jonathan George, Vienne (FR); Andrea Grosso, Turin (IT); Raimo Piittala, Tampere (FI); Kay Rokman, Karhula (FI); Kaj Back, Tampere (FI)

(73) Assignee: Ahlstrom Paper Group Research and Competence Center, Pont-Eveque (FR)

(*) Notice: Subject to any disclaimer, the term of this patent is extended or adjusted under 35 U.S.C. 154(b) by 0 days.

This patent is subject to a terminal disclaimer.

(21) Appl. No.: 09/655,363

(22) Filed: Sep. 5, 2000

(51) Int. Cl.$^7$ .............................................. D21H 23/00
(52) U.S. Cl. ...................... 162/101; 162/123; 162/125; 162/127; 162/128; 162/129; 162/181.1; 162/183
(58) Field of Search .............................. 162/101, 123, 162/125, 127, 128, 129, 132, 181.1, 181.6, 181.9, 183, 184, 186, 32, 2, 343

(56) References Cited

U.S. PATENT DOCUMENTS

| | | | |
|---|---|---|---|
| 3,573,158 A | * | 3/1971 | Pall et al. .................... 162/145 |
| 3,871,952 A | | 3/1975 | Robertson |
| 3,939,782 A | | 2/1976 | Robertson |
| 4,349,414 A | | 9/1982 | Stenberg |
| 5,486,410 A | | 1/1996 | Groeger et al. |
| 5,552,092 A | | 9/1996 | Francis et al. |
| 5,589,256 A | | 12/1996 | Hansen et al. |
| 5,605,746 A | | 2/1997 | Groeger et al. |
| 5,662,728 A | | 9/1997 | Groeger |
| 5,674,339 A | | 10/1997 | Groeger et al. |
| 5,779,847 A | | 7/1998 | Groeger et al. |
| 5,885,696 A | | 3/1999 | Groeger et al. |
| 5,904,809 A | | 5/1999 | Rokman et al. |
| 5,952,092 A | | 9/1999 | Groeger et al. |
| 5,972,808 A | | 10/1999 | Groeger et al. |
| 6,019,871 A | | 2/2000 | Rokman et al. |
| 6,024,813 A | | 2/2000 | Groeger et al. |
| 6,054,022 A | | 4/2000 | Helwig et al. |
| 6,136,153 A | * | 10/2000 | Rokman et al. ............. 162/101 |
| 6,238,518 B1 | | 5/2001 | Rokman |

FOREIGN PATENT DOCUMENTS

EP  0 634 523 B1  1/1999

* cited by examiner

*Primary Examiner*—Peter Chin
(74) *Attorney, Agent, or Firm*—Nixon & Vanderhye P.C.

(57) ABSTRACT

A non-woven web of fibrous material containing a reactive particulate material is made using the wet laid, or preferably foam, process. First and second fibrous webs are made using the wet laid or foam process, and a liquid or foam slurry including reactive particulate material is provided between the webs so as to provide a composite web. Liquid, or foam and liquid, are withdrawn from the composite web and then the composite web is dried so as to produce a final non-woven web with reactive material having substantially optimum reactivity (that is the reactive material loses a minimum amount reactivity during the web production process). The webs and slurry may be made using substantially pure water, and the particulate part of the reactive material is mixed with the foam or liquid slurry no more than about ten seconds before the liquid and/or foam are withdrawn from the composite web. Activated carbon and titanium dioxide are two particularly desirable reactive particulates; the reactive loading is at least 0.01 g/cm$^3$, and the air permeability of the final web is at least 3000 liters per square meter per second.

18 Claims, 1 Drawing Sheet

PRODUCTION OF REACTIVE MATERIAL CONTAINING WEBS

BACKGROUND AND SUMMARY OF THE INVENTION

In the manufacture of non-woven products including reactive materials (such as activated carbon), whether for the manufacture of filters, clothing, or other non-woven products, it is highly desirable to utilize the active material in some sort of particulate form because in that form most active materials have their maximum activity. During the conventional production of non-woven webs using particulate active material by the conventional wet laid process (the wet laid process being describe per se in U.S. Pat. No. 4,349,414) if the active material is in particulate form it loses a significant portion of its reactivity because the liquid dissolves part of the active material and is drawn away from the web during the production process, and for other reasons depending upon the particular materials involved. An air laid (see U.S. Pat. No. 5,779,847 for example) product has been developed which avoids the degradation of the reactivity of the particulate material to a significant extent during the manufacture of non-woven webs, however the air laid process is significantly slower than the wet laid process, and therefore there is much lower productivity and higher costs for the products produced.

According to the present invention a method and product are provided which utilize either the wet laid process, or preferably the foam process (as described, for example, in U.S. Pat. No. 5,904,909 and in co-pending application Ser. No. 09/260,024 filed Mar. 2, 1999, the disclosures of which are hereby incorporated by reference herein). According to the present invention it is possible to obtain the speed and productivity of the wet laid or foam processes in the manufacture of non-woven webs of fibrous material containing an active at least partly particulate material (typically at least about 80% particulate form), while maintaining substantially optimum reactivity of the active particulate material. This is accomplished according to the present invention by providing a liquid, or preferably foam, slurry including the active particulate material between first and second webs primarily of fibrous material during the manufacture thereof by the wet laid, or preferably foam, process, and substantially at or after the combination thereof withdrawing liquid, or foam and liquid, from the composite and then drying the composite to produce a final non-woven web with active material therein having substantially optimum reactivity. Maintenance of substantially optimum reactivity can also be achieved by making the slurry using a particulate material no more than about ten seconds prior to the initiation of the withdrawal of the liquid and/or foam from the composite web, and by using substantially pure water (which includes distilled, deionized, and reverse osmosis water) as the liquid for the wet laid process, or for use in the production of the foam for the foam process or slurry.

By practicing the invention the speed of production and productivity may be high. The invention can be accomplished utilizing already known equipment, such as shown in co-pending application Ser. No. 09/260,024 for the foam process, or for the wet laid process U.S. Pat. No. 4,349,414.

The invention can be practiced with a wide variety of active materials, such as disclosed in U.S. Pat. No. 5,779,847, and with a wide variety of fibers including cellulose fibers, glass, aramid, synthetic (such as polyester, polypropylene, polyamide), etc. The active material is preferably at least about 80% particulate material, but some fibrous material can also be utilized. For example carbon fibers can be combined with powdered activated carbon as an active component utilized in the practice of the invention.

According to one aspect of the present invention there is provided a method of making a non-woven web of fibrous material containing an active at least partly particulate material, comprising: a) Making first and second webs primarily of fibrous material using the wet laid or foam processes. b) Forming a liquid or foam slurry including active at least partly particulate material. c) Providing the slurry from b) between the first and second webs during manufacture thereof, so as to provide a composite web. And, d) substantially at or after c), withdrawing liquid, or foam and liquid, from the composite web, and then drying the composite web so as to produce a final non-woven web with active material therein having substantially optimum reactivity.

In the invention, preferably a) and b) are practiced using substantially pure water as or in the liquid or foam for slurrying the active material and for use in the wet laid or foam process. In the invention one of the preferred materials in the practice of b) is the utilization of activated carbon as at least part of the particulate active material (or substantially all thereof), and d) may also be practiced using titanium dioxide as a particulate material in the liquid or foam slurry. Preferably a) is practiced using the foam process, and b) is practiced using the foam slurry. Typically b) is practiced by mixing at least the particulate part of the active material with the foam slurry no more than about ten seconds before the practice of d). Typically a) through d) are practiced at a carbon loading of between about 0.25–1 g/cm$^3$, and to produce a product having an air permeability over 3000 liters per square meter per second at 200 Pa.

The invention may further comprise making the final non-woven web into a useful product, such as a filter (including pleated filters) for automotive, household, or industrial use, making clothing, or making other types of materials.

The method may also further comprise e) providing at least one other liquid or foam web or slurry, and f) combining the at least one other liquid or foam web or slurry with other webs and slurry substantially at or prior to d) so that the final non-woven web produced includes the at least one other liquid or foam web. For example in the method b) and e) are practiced by mixing at least the particulate part of the active material and titanium dioxide with the foam slurry no more than about ten seconds before the practice of d). Also a), b), and e) may be practiced using substantially pure water in the foam for slurrying the active material and for use in the foam process.

The invention also relates to a non-woven web with active material therein having substantially optimum reactivity, made by any of the processes as described above. Especially when the foam process is utilized according to the invention, there are an almost infinite variety of sizes and types of fibers and active materials that may be utilized, and provided in the final web.

According to another aspect of the invention there may be provided a method of making a non-woven web of fibrous material containing an active material, comprising: a) Making first and second webs primarily of fibrous material using the wet laid or foam processes. b) Forming a liquid or foam slurry including active material. c) Providing the slurry from b) between the first and second webs during manufacture thereof, so as to provide a composite web. And d) substantially at or after c), withdrawing liquid, or foam and liquid, from the composite web, and then drying the composite web so as to produce a final non-woven web with active material therein having substantially optimum reactivity. In the method b) may be practiced using at least one of active material fibers, e.g. carbon fibers, and active material particles, e.g. carbon particles as described above.

It is the primary object of the present invention to provide a simple, high productivity, and effective method of making a non-woven web of fibrous material with active material therein having substantially optimum reactivity, and the web so produced. This and other objects of the invention will become clear from an inspection of the detailed description of the invention, and from the appended claims.

DETAILED DESCRIPTION OF THE DRAWINGS

Figure 1:
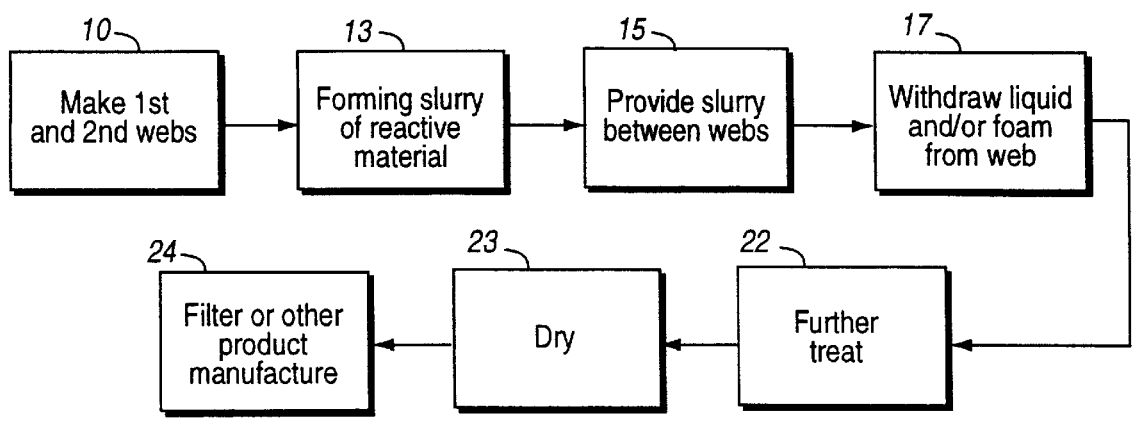
FIG. 1 is a schematic, box, diagram illustrating an exemplary method according to the present invention.
Figure 2:
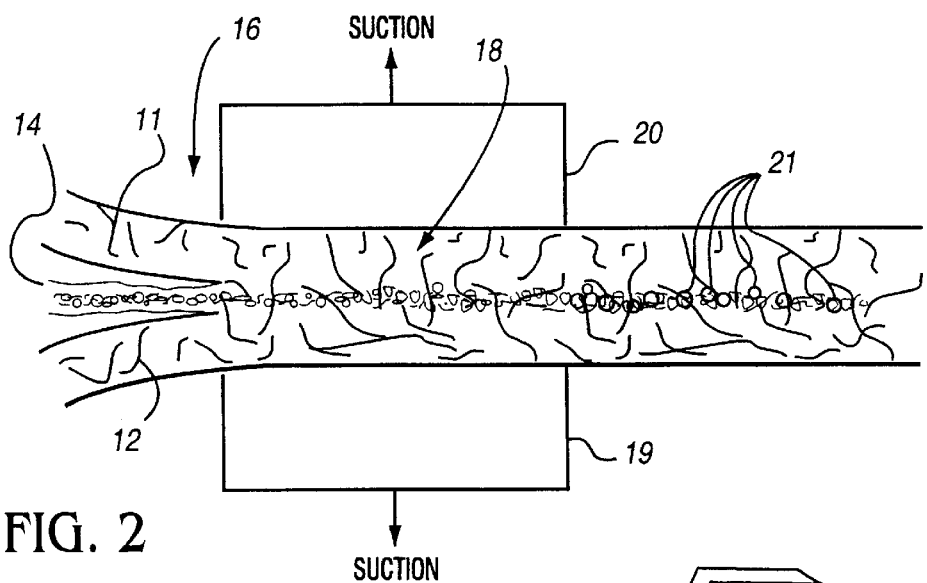
FIG. 2 is a schematic side view showing combining webs and a slurry in one exemplary practice of the method according to the present invention.

FIG. 1 very schematically illustrates one exemplary method for the practice of the present invention, for the manufacture of a non-woven web with active material therein having substantially optimum reactivity. FIG. 2 is a schematic illustration of various portions of the slurries during the manufacture.

As illustrated in FIG. 1, first and second webs, primarily (up to substantially exclusively) of fibrous material, are made using the wet laid or the foam process, as illustrated schematically at 10 in FIG. 1. These first and second webs are illustrated schematically at 11 and 12 in FIG. 2, and are preferably made utilizing two conventional foraminous elements and according to the process and utilizing the equipment as disclosed in co-pending application Ser. No. 09/260,024.

FIG. 1 also illustrates by box 13 forming a slurry of active material at least partly in particulate form. The slurry may be a liquid slurry, but preferably is a foam slurry, and is illustrated schematically at 14 in FIG. 2. The slurry may be of a wide variety of different types and sizes of active material, and the variety of different types and sizes of active material is enhanced significantly if the slurry 14 is a foam slurry, as described in co-pending application Ser. No. 09/260,024 or in U.S. Pat. No. 6,019,871. Typically at least about 80% (e.g. about 80–95%) of the active material is in particulate form since particulate form has maximum reactivity. However some of the active material may be in fiber form (particularly carbon fibers where the primary active material is activated carbon), and other materials may also be added to the slurry 14. If necessary, depending upon the active material, it may be coated with a coating (e.g. a light cellulose or starch or plastic coating) that protects the active material but will dissolve after a few seconds in contact with foam or liquid, so as to absolutely minimize the dissolution or other adverse affects on the reactivity of the active material.

As indicated at 15 in FIG. 1, the slurry of active material is provided between the first and second webs 11,12, as illustrated schematically in FIG. 2 generally at the area 16, preferably utilizing equipment such as shown in co-pending application Ser. No. 09/260,024. Substantially at or after a combination of the webs and slurry at 16, as illustrated schematically at 17 in FIG. 1, liquid, or foam and liquid, are withdrawn from the composite web 18 that ensues, utilizing conventional suction boxes, suction cylinders, or like equipment, for that purpose. FIG. 2 schematically illustrates conventional suction boxes 19 and 20 at both major faces of the composite web 18 for withdrawing the liquid and/or foam therefrom. Where the suction is provided at both major faces of the composite web 18—as illustrated in FIG. 2—the active particles, shown schematically and typically enlarged for clarity of illustration, at 21 in FIG. 2, stay at or near the middle portion of the composite web 18, whereas if suction is provided at only one face or is higher at one face than the other, there may be a migration (which might be desirable or undesirable depending upon the particulate active material and the end function of the product produced) toward one face of the composite web 18.

After the composite web 18 is formed, the composite web may be further treated utilizing conventional techniques, as schematically illustrated at 22 in FIG. 1, e.g. by washing, coating, applying a binder, etc., although it is highly desirable to—for most end products—maintain the composite web 18 so that it is highly air permeable. Ultimately the web is then dried as illustrated schematically at 23 in FIG. 1, utilizing conventional techniques (such as shown in application Ser. No. 09/260,024), producing a final non-woven web with active material therein having substantially optimum reactivity.

Figure 3:
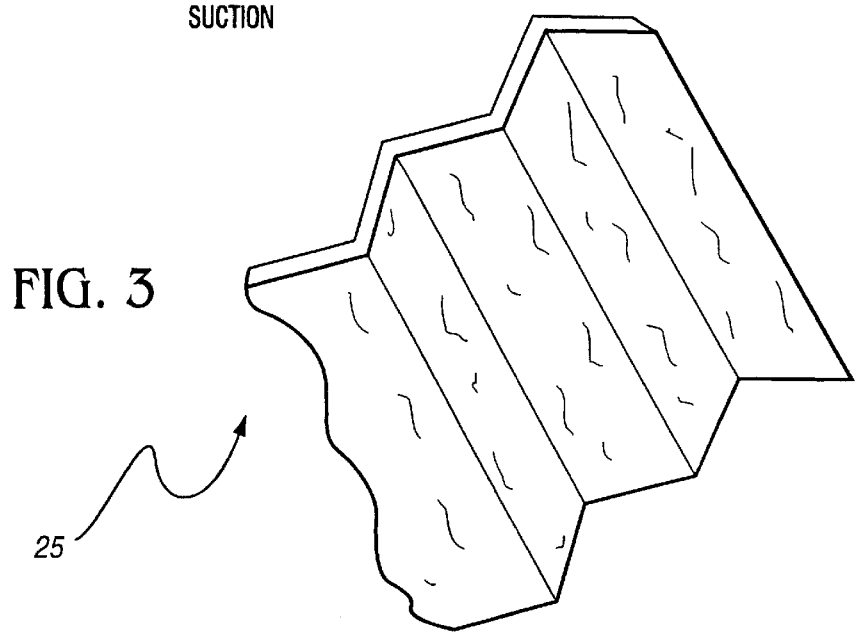
FIG. 3 is a schematic perspective view of a portion of a end product (filter) made from a non-woven material according to the present invention.

As illustrated schematically at box 24 in FIG. 1, the final web is ultimately made into a final product, such as a filter, clothing, wall covering, or the like, depending upon the particular end product that is desired. FIG. 3 schematically illustrates a pleated filter 25, such as used in air filtration in automobiles or homes, made from the final web according to the invention.

While activated carbon is described above is the preferred active material, it is to be understood that other types of active particulate include silica, zeolite, molecular sieve, clay, alumina, sodium bicarbonate, ion exchange resin, catalytic agents including enzymatic agents, metal oxide, and biocidal, fungicidal, virucidal, air freshening and perfuming particulates, such as titanium dioxide, may be used. Fungicidal particulate may be incorporated into a filter structure, such as for an automobile climate control system to remove mildew and mildew odors from circulated air. This list is only representative of the wide variety of active particulate materials available, and not in limiting of the substances suitable for use in the practice of the present invention.

Active particulates may range in size from about 1 micron or less to about 3 to 10 mm or more (especially if the foam process is used) in average diameter, and may vary in shape from, for example, regularly shaped, spheroidal beads and cylinders, to irregularly shaped particles or granules. However the particulate beneficially has suitable physical characteristics including an appropriate size to be entrapped by the web structure.

Activated carbon particles of about 400 to 500 microns are highly suitable for entrapment in a generally uniform web made from fibers having an average diameter of about 15 microns.

While the loading of active material (e.g. carbon) will depend widely upon the ultimate end use desired, as will its air permeability, the web according to the invention may have specific active loading of at least 0.01 g/cubic centimeter of active particulates, and may have an air permeability greater than 100 liters per square centimeter per hour at 200 Pa. Specific loadings of 0.25–1 g/cc, and an air permeability of about 150–250 liters per square centimeter per hour or more, at 200 Pa, are desirable, and air permeability is preferably over 3000 liters per meter squared per second at 200 Pa.

While the above description has been with respect to two initial webs 11,12 and one initial slurry 14, it is to be understood that other webs or slurries may also be utilized. For example instead of adding titanium dioxide particles into the slurry 14 with activated carbon particles, a separate slurry of the titanium dioxide particles may be utilized, and combined generally at the area 16 illustrated in FIG. 2 with the webs 11,12 and the slurry 14, again using equipment such as described in co-pending application Ser. No. 09/260, 024. Other webs may also be utilized, and other slurries can be added between other webs, or between the webs 11, 12 as seen in FIG. 2. For example a third web may be manufactured below the web 12 as illustrated in FIG. 2, and a second slurry (e.g. of titanium dioxide particles) provided between the web 12 and the lower web and combined generally at the area 16 prior to dewatering to form a composite web 18.

The method according to the present invention can be practiced with the conventionally high speed and productivity of the wet laid or foam processes. The method according to the present invention can be practiced at any speed, for example, a speed of at least about 100 lineal feet per minute, typically between about 100–400 lineal feet per minute, and on machines having a width of 36 inches, 42 inches, or even much more, depending upon the particular fibers and active materials utilized, to provide high productivity.

In the practice of the invention in order to optimize productivity preferably the liquid forming the slurries for the webs 11, 12, and the intermediate slurry 14, or the liquid used in making the foam for the webs 11, 12 and the slurry 14, is substantially pure liquid (distilled, deionized, reverse osmosis, or a like water) so that there is a minimum of contaminants in the product and thus optimum reactivity of the particulate material utilized, such as the particles 21. Also in order to optimize reactivity, the foam or liquid forming the slurry is mixed with the particulate material (having the particles 21) no more than about ten seconds before the slurry 14 and associated webs 11, 12 are moved into operative association with the liquid and/or foam withdrawal mechanisms (such as suction boxes 19, 20), giving a minimum time for the active material to dissolve. Where essential or desired, the active material particles may be coated with a protective cover which will dissolve after a few sections of contact with liquid or foam, to even further enhance the reactivity of the particles 21 in the final web.

The filter 25 produced utilizing conventional techniques from the final web according to the present invention has a uniform distribution of the active material therein, and high reactivity, so that it functions substantially as well as, or better than (depending upon the active material sizes and constituents utilized, or the fibers involved and the thickness of the ultimate web, etc.), similar products made utilizing the air laid process of U.S. Pat. No. 5,779,847, yet are produced substantially at the speed of the conventional wet laid or foam processes.

It is to be understood that the invention also specifically encompasses all narrow ranges within each broad range. For example, the recitation of the particle portion of the active material comprising at least about 80% of the active material means 81–100%, 89–93%, 90–95%, and all other narrow ranges within the broad range.

It will thus be seen that according to the present invention a simple, yet highly effective method is provided for quickly, easily, and effectively producing non-woven webs having active materials therein with substantially optimum reactivity, and the advantageous webs (or products made from the webs) so produced. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent methods and products.

What is claimed is:

1. A method of making a non-woven web of fibrous material containing an active at least partly particulate material, comprising:

a) making first and second webs primarily of fibrous material using a foam process;

b) forming a foam slurry including active at least partly particulate material;

c) providing the slurry from b) between the first and second webs during manufacture thereof, so as to provide a composite web; and d) substantially at or after c), withdrawing foam and liquid from the composite web, and then drying the composite web so as to produce a final non-woven web with active material therein having substantially optimum reactivity.

2. A method as recited in claim 1 wherein a) and b) are practiced using substantially pure water in the foam for slurrying the active material and for use in the foam process.

3. A method as recited in claim 2 wherein b) is practiced using activated carbon as at least part of the particulate active material.

4. A method as recited in claim 1 wherein b) is practiced using activated carbon as at least part of the particulate active material.

5. A method as recited in claim 4 wherein b) is practiced also using titanium dioxide as a particulate active material in the liquid or foam slurry.

6. A method as recited in claim 5 further comprising making the final non-woven web into a filter.

7. A method as recited in claim 1 wherein the active material is at least about 80% in particulate form.

8. A method as recited in claim 1 wherein b) is practiced by mixing at least the particulate part of the active material with the foam slurry no more than about ten seconds before the practice of d).

9. A method as recited in claim 1 wherein a)–d) are practiced with a loading of at least partly particulate active material of at least 0.01 g/cm$^3$ and to produce a product having an air permeability of at least 3000 liters per meter squared per second at 200 Pa, and wherein the active material is at least about 80% in particulate form.

10. A method as recited in claim 1 further comprising e) providing at least one other liquid or foam web or slurry, and f) combining the at least one other liquid or foam web or slurry with other webs and slurry substantially at or prior to d) so that the final non-woven web produced includes the at least one other liquid or foam web.

11. A method as recited in claim 10, wherein e) is practiced using a foam process or a foam slurry.

12. A method as recited in claim 11, wherein e) is practiced to provide a foam slurry including titanium dioxide particles, and b) is practiced using at least some activated carbon particles.

13. A method as recited in claim 12, further comprising making the final non-woven web into a filter.

14. A method as recited in claim 13, wherein b) and e) are practiced by mixing at least the particulate part of the active material and titanium dioxide with the foam slurry no more than about ten seconds before the practice of d).

15. A method as recited in claim 11, wherein a), b), and e) are practiced using substantially pure water in the foam for slurrying the active material and for use in the foam process.

16. A method as recited in claim 4 wherein a)–d) are practiced at a carbon loading of between about 0.25–1 g/cm$^3$, and to produce a product having an air permeability of over 3000 liters per square meter per second at 200 Pa.

17. A method of making a non-woven web of fibrous material containing an active material, comprising:
   a) making first and second webs primarily of fibrous material using a foam process;
   b) forming a foam slurry including active material;
   c) providing the slurry from b) between the first and second webs during manufacture thereof, so as to provide a composite web; and
   d) substantially at or after c), withdrawing foam and liquid from the composite web, and then drying the composite web so as to produce a final non-woven web with active material therein having substantially optimum activity.

18. A method as recited in claim 17 wherein b) is practiced using at least one of active material fibers and particles as the active material.

* * * * *